United States Patent [19]

Kaneko et al.

[11] 3,963,681

[45] June 15, 1976

[54] URETHANE ELASTOMERS PREPARED FROM POLYETHERS HAVING A CERTAIN MOLECULAR WEIGHT DISTRIBUTION

[75] Inventors: Yoshio Kaneko, Higashi Murayama; Yoji Watabe, Kodaira; Tsutomu Matsunaga, Murayama; Shigeyuki Toki, Kodaira; Yutaka Iseda, Tachikawa, all of Japan

[73] Assignee: Bridgestone Tire Company Limited, Tokyo, Japan

[22] Filed: June 27, 1974

[21] Appl. No.: 483,535

[30] Foreign Application Priority Data

July 3, 1973   Japan.............................. 48-75551

[52] U.S. Cl. ................ 260/77.5 AM; 260/77.5 AP
[51] Int. Cl.² ........................................ C08G 18/48
[58] Field of Search ............ 260/77.5 AP, 77.5 AM

[56] References Cited
UNITED STATES PATENTS

3,798,200   3/1974   Kaneko et al. ............. 260/77.5 AM

*Primary Examiner*—M. J. Welsh
*Attorney, Agent, or Firm*—Brooks Haidt Haffner & Delahunty

[57] ABSTRACT

Polyether urethane elastomer composition having improved mechanical properties has been prepared by using polyfunctional isocyanate, curing agent and polyether having active hydrogen terminal groups, wherein the weight average molecular weight of said polyether is within the range of 1,000 to less than 4,500 and the molecular weight distribution curve of said polyether has at least two peaks, at least one of which is located in the higher molecular weight region and at least another one of which is located in the lower molecular weight region than the rheological critical molecular weight of said polyether and wherein the equivalent ratio (d) of active hydrogen of a curing agent to the isocyanate group of said polyfunctional isocyanate is in the range of $0.9 < d < 1.2$.

14 Claims, 3 Drawing Figures

FIG. 3

URETHANE ELASTOMERS PREPARED FROM POLYETHERS HAVING A CERTAIN MOLECULAR WEIGHT DISTRIBUTION

BACKGROUND OF THE INVENTION

1. Field of the Invention

This invention relates to a polyether urethane elastomer composition having an improved cut-growth and flex-crack resistance and especially having a high fracture resistance at high temperature and at high speed testing condition, and to the process for preparation thereof.

2. Description of the Prior Art

A urethane elastomer is well known to be castable to desired articles under the atmospheric pressure before curing and to have good mechanical properties after curing. Therefore, a urethane elastomer is widely used for preparing rollers, machine parts, solid tires, and the like.

The products made of a polyether urethane elastomer are, however, limited to being used under mild conditions of dynamic deformation, because of the poor cut-growth and flex-crack resistance of a polyether urethane elastomer.

In order to improve this resistance, many attempts have been tried. For example, the nature and the amount of curing agents and the molecular weight of polyether glycol have been studied by many people. However, satisfactory results of these attempts have never been reported. For example, the cut-growth and flex-crack resistance of a polyether urethane elastomer can be improved, to some extent, by increasing the number average molecular weight of the polyether used for a raw material, but such polyether urethane elastomer can not be applied to practical uses since the modulus and the tensile strength at break are extremely low and the permanent set is large.

Our extensive investigation on this problem resulted in the discovery of a new polyether urethane elastomeric composition having improved cut-growth and flex-crack resistance, which was described by us in the specification of U.S. Ser. No. 314,848 filed on Dec. 13, 1972, now U.S. Pat. No. 3,798,200. The specification stated that improved resistance for cut-growth and for flex-cracking can be attained by preparing a polyurethane elastomer by using selected polyether glycol having weight average molecular weight of 4,500 to 20,000, wherein the molecular weight distribution curve of the polyether has at least two peaks and at least one of which is located in the higher molecular weight region and at least another one of which is located in the lower molecular weight region than the rheological critical molecular weight of the polyether. Fracture resistance of this polyether urethane elastomer at high temperature or at high speed testing conditions was, however, found to be inferior in comparison to the conventional polyether urethane elastomer produced by using polyether having a molecular weight distribution curve of a mono-dispersed type. In this connection, the improvement of fracture resistance at high temperature and at high speed testing conditions are desired for urethane elastomer together with the good resistance for cut-growth and for flex-cracking.

SUMMARY OF THE INVENTION

According to one aspect of the present invention, there is provided polyether urethane elastomer composition having improved cut-growth and flex-crack resistance and excellent fracture resistance prepared by using polyfunctional isocyanate, curing agent and polyether having active hydrogen terminal groups, wherein weight average molecular weight of said polyether is within the range of 1,000 to less than 4,500 and the molecular weight distribution curve of said polyether has at least two peaks, at least one of which is located in the higher molecular weight region and at least another one of which is located in the lower molecular weight region than the rheological critical molecular weight of said polyether (hereinafter called "DHDM type polyether". The term DHDM type polyether denotes a polyether having double or multi humped distribution of molecular weight.) and wherein the equivalent ratio ($d$) of active hydrogen of a curing agent to the isocyanate group of said polyfunctional isocyanate is in the range of $0.9 < d < 1.2$.

According to another aspect of the present invention there is provided a process for preparing polyether urethane elastomer composition having improved cut growth and flex crack resistance and excellent fracture resistance.

An object of this invention is to provide a polyether urethane elastomer composition having an extremely improved cut-growth while flex-crack resistance and keeping tensile strength of high level compared with the conventional polyurethane elastomer produced by using polyether having a molecular weight distribution curve of a mono-dispersed type, not only at room temperature but also at high temperature and at high speed testing conditions, and also keeping good casting processability before curing.

The polyether urethane elastomer composition of this invention is suitable for the rubbery structural materials of an air spring, a solid tire, a pneumatic tire, a damper, a roller, a belt, and the like, especially suitable for a casting tire.

The viscosity of a polyether is measured by means of Instron Capillary Rheometer at a constant shear rate and at a constant temperature.

The number average molecular weight of polyether is determined from the count number at the peak of the GPC curve, by using a calibration curve between the count number at the peak of the GPC curve and the number average molecular weight observed by means of a vapor pressure osmometer (VPO) or a membrane osmometer (MO).

Figure 1:
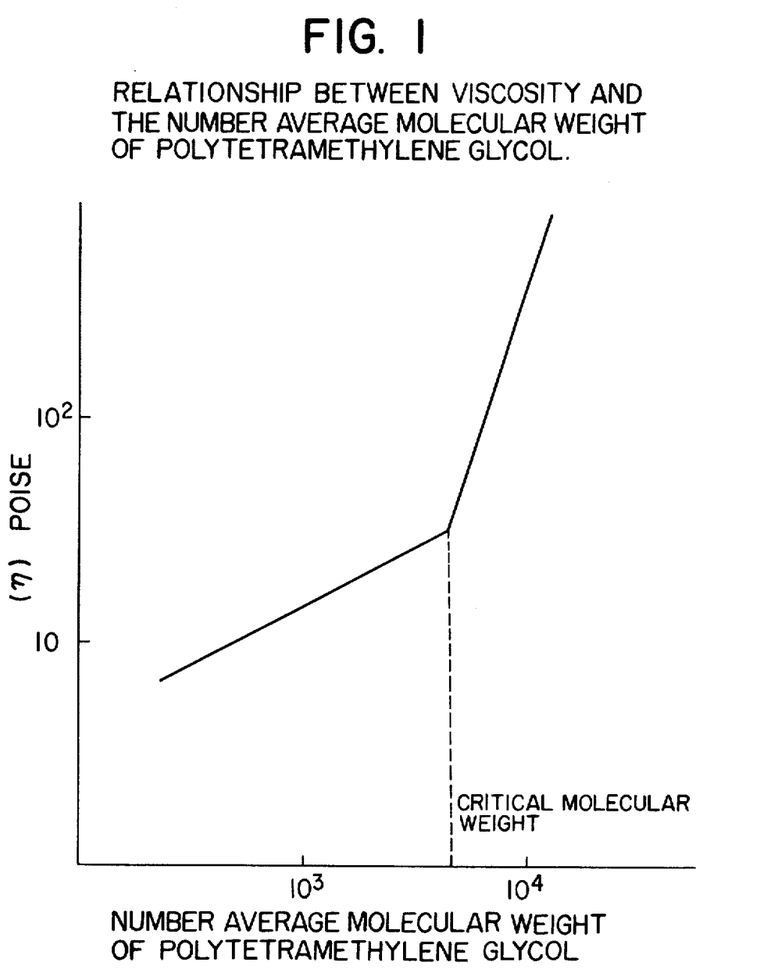
FIG. 1 shows relationship between viscosity and number average molecular weight of polytetramethylene glycol.
Figure 2:
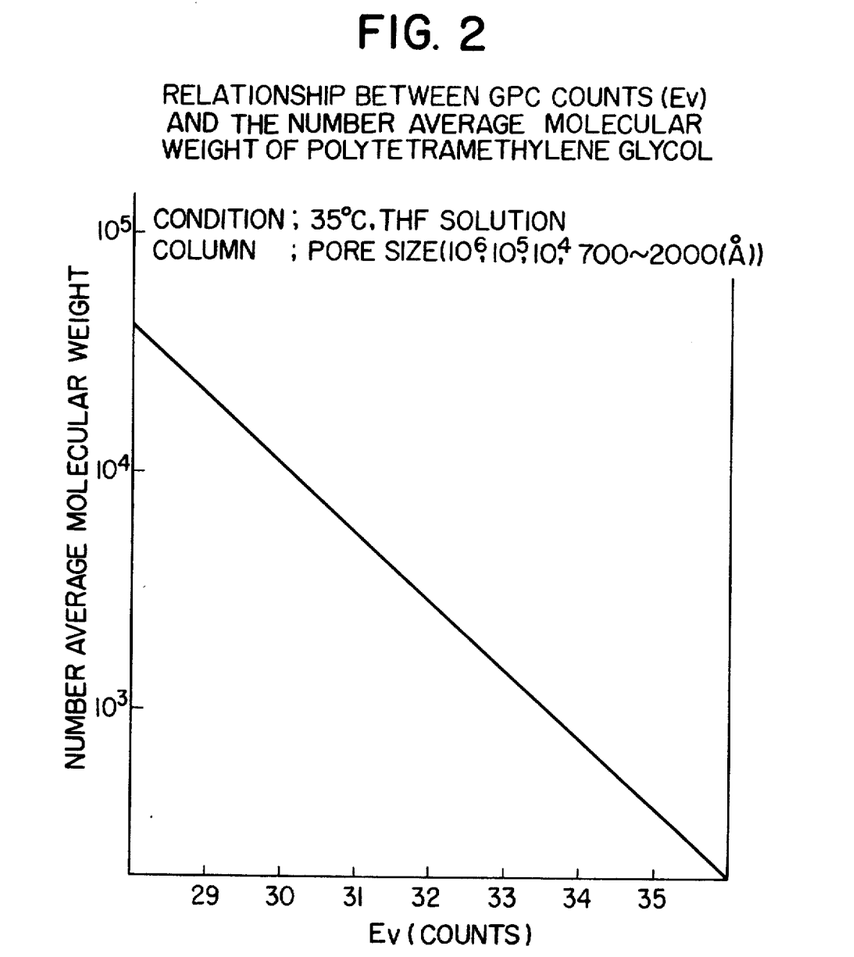
FIG. 2 shows the relationship between GPC count number and number average molecular weight of polytetramethylene glycol.

The critical molecular weight (Mc) is a specific characteristic of the nature of polyether, and Mc can be determined from the refraction point on the relationship between viscosity and number average molecular weight of the polyether. The Mc of polytetramethylene glycol is determined to be 4,500 as shown in FIG. 1.

The weight average molecular weight of polyether is calculated from the molecular weight distribution curve divided into each 0.5 count.

The molecular weight distribution curve of polyether is determined by means of a gel permeation chromatograph (GPC).

The GPC curve of polyether is determined by means of a Model 200 GPC of Waters Co. by using tetrahydrofuran (THF) as solvent at 35°C.

The term "peak" used herein represents not only an apparent maximum peak, but also a shoulder in the molecular weight distribution curve.

DESCRIPTION OF THE PREFERRED EMBODIMENTS

The polyether used in this invention is a polyether having a terminal functional group containing active hydrogen capable of reacting with an isocyanate group. The functional group is selected from the group consisting of hydroxyl group, mercapto group, amino group and carboxyl group.

As a polyether, a pre-extended polyether may be also used, which is prepared by subjecting a low molecular weight polyether to reaction with a diisocyanate or by subjecting a diol compound to reaction with a diisocyanate prepolymer of polyether.

Polyethers used in this invention are alkylene glycol such as polyethylene glycol, polypropylene glycol, polytetramethylene glycol and the like, polyalkylene triol such as polypropylene triol and the like, polyalkylene dicarboxylic acid, polyalkylene dithiol, polyalkylene diamine and their pre-extended polymer, and preferably polyalkylene glycol, and more preferably polytetramethylene glycol and its pre-extended polymer.

The polyethers used in this invention may be prepared by admixing at least one polyether having the peak of the molecular weight distribution curve in the lower molecular weight region than the rheological critical molecular weight (hereinafter called "critical molecular weight") with at least one polyether having the peak of the molecular weight distribution curve in the higher molecular weight region than the critical molecular weight of the polyether, wherein the former lower molecular weight polyether is admixed as a principal ingredient.

The weight average molecular weight of the polyether having the molecular weight distribution curve of the DHDM type and used in this invention is in the range of 1,000 to less than 4,500.

The polyethers used in this invention may also be prepared directly by polymerization methods. This invention also includes the mixture of two or more different kinds of polyether of which critical molecular weights are different from each other, for example, the mixture of polypropylene glycol and polytetramethylene glycol may be also used. In this case, it is essential that at least one peak is located at the lower molecular weight region than the lowest critical molecular weight of the polyether and at least one peak is located at the higher molecular weight region than the highest critical molecular weight of the polyether, and the weight average molecular weight of the mixture is in the range of 1,000 to less than 4,500.

It is one of essential factors of this invention to use the DHDM type polyether. Otherwise, as shown in Comparative Examples described hereinafter, the object of this invention can not be attained. The cut-growth and flex-crack resistance of polyether urethane elastomer can not be improved by using polyethers having a molecular weight distribution curve of a mono-dispersed type or of a poly-dispersed type wherein all peaks of the molecular weight distribution curve are located in the lower molecular weight region than the critical molecular weight of the polyether.

The elastomer produced by using a polyether in which all peaks are located in the higher molecular weight region than the critical molecular weight of the polyether has only very low tensile strength; therefore an elastomer having improved cut-growth and flex-crack resistance while keeping high tensile strength at the same time can not be prepared by this method.

It is another essential factor of this invention that the weight average molecular weight of the polyether or of the mixture of polyethers is in the range of 1,000 to less than 4,500. The polyether urethane elastomer composition prepared by using polyether or polyethers having DHDM type molecular weight distribution and having weight average molecular weight of 1,000 to less than 4,500 shows high fracture resistance at high temperature and at high speed testing conditions in addition to the excellent cut growth and flex crack resistance.

Satisfactory results can not be obtained by using the polyether or polyethers having a weight average molecular weight of lower than 1,000 or not lower than 4,500. For example, the elastomer produced by using the polymer having the weight average molecular weight of lower than 1,000 does not show an improved cut growth and flex crack resistance regardless of its molecular weight distribution curve of the DHDM type, and the elastomer produced by using the polyether having the weight average molecular weight of not lower than 4,500 does not show any high tensile strength and casing processability before curing.

It is another essential factor of this invention that the equivalent ratio ($d$) of active hydrogen of a curing agent to the isocyante group of polyfunctional isocyanate is in the range of $0.9<d<1.2$.

When the equivalent ratio ($d$) is less than 0.9, the cut growth and flex crack resistance of the elastomer composition can not be improved, as shown in Comparative Example. When the equivalent ratio ($d$) is much more than 1.2, the tensile strength of the elastomer composition at room temperature and especially at high temperature and at high speed testing conditions is further inferior to that of any elastomer composition prepared at the equivalent ratio ($d$) being $0.9<d<1.2$ as shown in the Comparative Example.

There are many processes for preparation of the polyether urethane elastomer of this invention.

One-stage reaction method implies subjecting said polyether or polyethers to reaction with polyfunctional isocyanate and a curing agent at the same time.

Two-stage reaction method implies producing at first the prepolymer having a terminal isocyanate by the reaction between said polyether or polyethers and the polyfunctional isocyanate groups at first and then producing the cured elastomer by reaction between the above prepolymer and a curing agent.

Polyfunctional isocyanates used in this invention are not particularly limited, but are preferably aromatic and aliphatic diisocyanates and triisocyanates.

Aromatic diisocyanates are, for example, tolylene-2,4-diisocyanate, tolylene-2,6-diisocyanate, naphthalene-1,5-diisocyanate, diphenyl-4,4'-diisocyanate, diphenylmethane-4,4'-diisocyanate, dibenzyl-4,4'-diisocyanate, stilbene-4,4'-diisocyanate, benzophenone-4,4'-diisocyanate, diphenylether-or diphenylsulphide-4,4'-diisocyanate and their derivatives substituted with alkyl, alkoxy, halogen or nitro groups, e.g., 3,3'-dimethyldiphenyl-4,4'-diisocyanate or 3,3'-dichlorodiphenylmethane diisocyanate, their mixtures and the like.

Aliphatic diisocyanates are, for example, 1,6-hexamethylene diisocyanate, 1,3- and 1,4-cyclohexyl diisocyanate, methylene bis (4-cyclohexyl-isocyanate), 1,3- and 1,4-xylene diisocyanate, their mixtures and the like.

Triisocyanates are, for example tolylene-2,4,6-triisocyanate, diphenylether-2,2',4-triisocyanate, triphenylmethane-4,4',4''-triisocyanate, dicyclohexylmethane-2,2',4-triisocyanate and polymethylene polyphenyl isocyanate having the following formula wherein n is 1 – 8.

Among them, there may be preferably used to tolylene-2,4-diisocyanate, tolylene-2,6-diisocyanate, naphthalene-1,5-diisocyanate, diphenyl-4,4'-diisocyanate, 3,3'-dimethyldiphenyl-4,4'-diisocyanate, diphenylmethane-4,4'-diisocyanate, 3,3'-dichlorodiphenylmethane diisocyanate, 1,6-hexamethylene diisocyanate, 1,3- and 1,4-cyclohexyl diisocyanate, methylene bis (4-cyclohexyl diisocyanate), 1,3- and 1,4-xylene diisocyanate and their mixtures.

The curing agents in this invention may be aromatic or aliphatic polyamines or polyols.

Aromatic polyamines are, for example, 4,4'-methylenedianiline, methylene bis(ortho-chloroaniline), 2,2',5-trichloro-4,4'-methylenedianiline, naphthalene-1,5-diamine, ortho-, meta-, and para-phenylenediamine, tolylene-2,4-diamine, dichlorobenzidine, diphenylether-4,4'-diamine, aromatic polyamines represented by the following general formulae;

(1)

(wherein R represents a radical selected from the group consisting of —CH$_3$, —C$_2$H$_5$, —C$_3$H$_7$, —C$_4$H$_9$, —C$_8$H$_{17}$, and —CH(CH$_3$)—(CH$_2$)$_3$CH$_3$ and R' represents a radical selected from the group consisting of —H, —CH$_3$, —C$_4$H$_9$ and —C$_6$H$_{13}$.) and (2)

(wherein R'' represents a radical selected from the group consisting of —CH$_3$, —C$_2$H$_5$, —(CH$_2$)$_2$CH$_3$, —C$_4$H$_9$,

—C$_{18}$H$_{37}$ and —CH$_2$—CH(C$_2$H$_5$)—(CH$_2$)$_3$CH$_3$, and R''' represents a radical selected from the group consisting of —CH$_3$, —C$_2$H$_5$, —C$_3$H$_7$, —C$_4$H$_9$ and halogen residues.), and their derivatives and their mixtures.

Aliphatic polyamines are, for example, hydrazine, ethylenediamine, trimethylenediamine, diethylenetriamine, hexamethylene-1,6-diamine, propylenediamine, piperazine, and their mixtures. Polyols are, for example, ethylene glycol, 1,3-propylene glycol, 1,3- and 1,4-butanediol, pentanediol, hexanediol, decanediol, dodecanediol, trimethylolpropane, castor oil, glycerin, pentaerythritol, sorbitol, 4,4'-dihydroxyldiphenylmethane, resorcinol, thioglycol and polyols represented by the following formula;

(wherein n is an integer of 1 to 4) and their mixtures.

Among them, there are preferably employed methylene bis(ortho-chloroaniline), 4,4'-methylenedianiline, naphthalene-1,5-diamine, ortho-, meta-, and para-phenylenediamine, tolylene-2,4-diamine, dichlorobenzidine, diphenylether-4,4'-diamine, aromatic polyamines represented by the following general formula;

(wherein R represents a radical selected from the group consisting of —CH$_3$, —C$_2$H$_5$, —C$_3$H$_7$, and —C$_4$H$_9$), hydrazine, ethylenediamine, hexamethylene-1,6-diamine, piperazine, ethylene glycol, 1,3-propylene glycol, 1,3- and 1,4-butanediol, trimethylolpropane and their mixtures.

The equivalent ratio ($d$) of active hydrogen of a curing agent to the isocyanate group is selected from the range of $0.9 < d < 1.2$, and preferably from the range of 0.95 to 1.1.

The following examples are provided for illustration of this invention, and are not intended as limitations thereof.

In the following examples, the cut-growth and flex-crack resistance was determined by means of De Mattia fatigue tester.

The De Mattia fatigue test was carried out by using a test specimen of 50$^{mm}$ length, 10$^{mm}$ width, and 1$^{mm}$ thickness having a cut of 2$^{mm}$ width at its center in the right angled direction for elongation. Repeated 10% elongation-strain was applied at the rate of 300 cycles per minute until the specimen was broken. The number of cycles required up to break was regarded as an index of the cut-growth and flex-crack resistance of the specimen.

Tensile strength was determined by means of Instron Universal Tester at a tension speed of 50$^{mm}$ per minute by using a test specimen of the ring type having inside and outside diameters of 25$^{mm}$ and 29$^{mm}$, respectively.

Tensile strength at high speed was determined by means of Plastechon Tester at a tension speed of 1,000$^{mm}$ per second by using a similar specimen to that described above.

EXAMPLES 1 – 2 AND COMPARATIVE EXAMPLES 1 – 2

DHDM type polyethers were prepared by admixing two kinds of polytetramethylene glycol having terminal hydroxyl groups, which had different kinds of number average molecular weight, in such a manner that the lower molecular weight parts were in major parts, as shown in Table 1. As an example, a molecular weight distribution curve of the DHDM type polyether used in Example 1 was shown in FIG. 3.

One mole equivalent hydroxyl groups of said polyethers was subjected to reaction with two equivalent isocyanate groups of tolylene diisocyanate at 80°C for 8 hours to prepare the prepolymer having the isocyanate terminal groups.

Methylene bis(ortho-chloroaniline) was admixed with said prepolymer at the equivalent ratio of 1.0 to prepare a composition.

Said composition was cast into a slab mould and was cured in an oven at 100°C for 3 hours. For comparative Examples, the same procedure were applied for polytetramethylene glycol having molecular weight distribution curve of a mono-dispersed type.

The test results for each specimens are shown in Table 1.

On the other hand, in the case of the conventional urethane elastomer prepared by using polyethers having molecular weight distributions of mono-dispersed types, it was obvious that the cut-growth and flex-crack resistance was improved only at the sacrifice of the tensile strength especially at high temperature and at high-speed testing conditions as shown in Comparative Examples 1 and 2.

EXAMPLES 3 – 4 AND COMPARATIVE EXAMPLES 3 – 5

Following the procedure of Example 1 except that the number average molecular weights of polytetramethylene glycols were changed, the elastomeric specimens were prepared. The test results are shown in Table 2.

Table 2

| Example No. | Number Average Molecular Weight of Polyether (I) | (II) | Mixing Ratio I/II (wt/wt) | Weight Average Molecular Weight after Mixing | Cut-Growth and Flex-Crack Resistance (cycles) | Tensile Strength (kg/cm²) at room temperature | at 100°C | at high speed |
|---|---|---|---|---|---|---|---|---|
| Example 3 | 1,000 | 8,500 | 80/20 | 3,200 | No defect after 500,000 cycles | 490 | 215 | 280 |
| Example 4 | 1,000 | 8,500 | 70/30 | 4,200 | " | 430 | 200 | 240 |
| Comparative Example 3 | 1,000 | 8,500 | 60/40 | 5,200 | " | 200 | 85 | 100 |
| Comparative Example 4 | 4,000 | – | 100/0 | 4,400 | Not determined | 77 | Not determined | Not determined |
| Comparative Example 5 | 5,000 | – | 100/0 | 5,600 | " | 50 | " | " |

Figure 3:
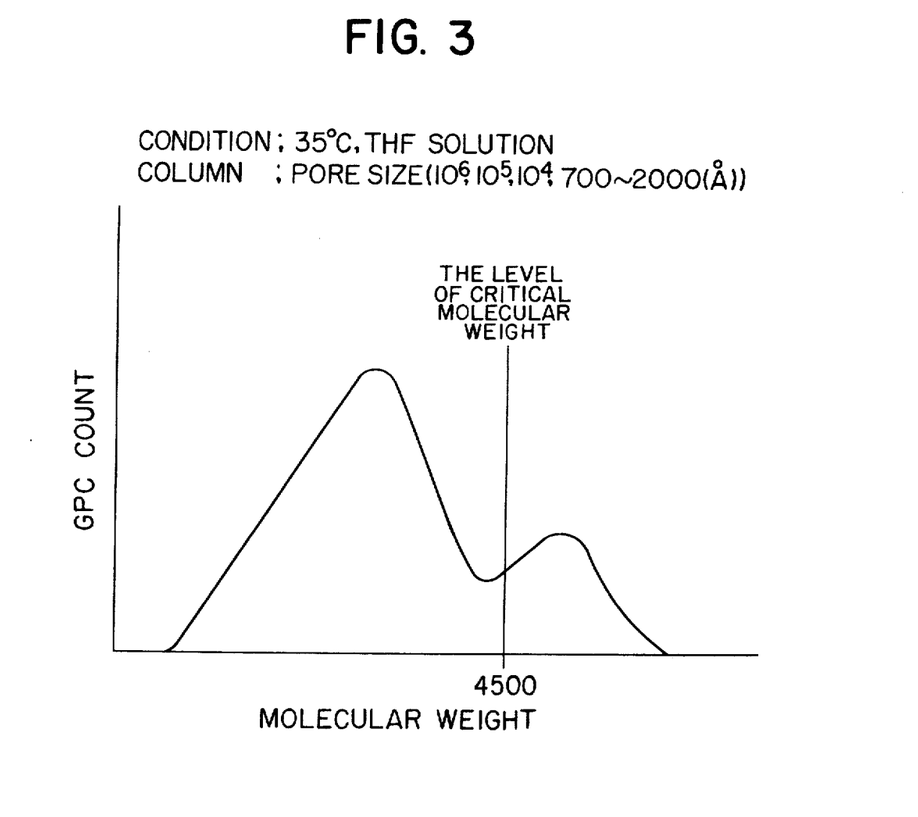
FIG. 3 shows the molecular weight distribution curve of the polytetramethylene glycol of Example 1.

As indicated in Table 2, Comparative Example 3, it can be seen that when a polyether having such a molecular distribution curve as shown in FIG. 3 is used if the weight average molecular weight of said polyether is not lower than 4,500 the value of tensile strength of the resultant decreases, especially under high temperature and high speed testing conditions.

Further, the results of Comparative Examples 4 and 5 indicate that the level of tensile strength was remarkably low in the case of polyurethane produced by using mono-dispersed type polyether.

COMPARATIVE EXAMPLES 6 – 7

The elastomeric specimens were prepared in a similar manner as described in Example 1 by using two kinds of polytetramethylene glycol in which both maximum peaks of the molecular weight distribution curves are located in the lower molecular weight region than the critical molecular weight in Comparative Example 6 and are located in the higher molecular weight region than the critical molecular weight in Comparative Example 7.

The test results are shown in Table 3.

Table 1

| Example No. | Number Average Molecular Weight of Polyether (I) | (II) | Mixing Ratio I/II (wt/wt) | Weight Average Molecular Weight after Mixing | Cut-Growth and Flex-Crack Resistance (cycles) | Tensile Strength (kg/cm²) at room temperature | at 100°C | at high speed |
|---|---|---|---|---|---|---|---|---|
| Example 1 | 800 | 11,500 | 75/25 | 3,150 | No defect after 500,000 cycles | 560 | 230 | 270 |
| Example 2 | 800 | 11,500 | 65/35 | 4,090 | " | 510 | 220 | 240 |
| Comparative Example 1 | 2,500 | – | 100/0 | 3,300 | 90,000 | 405 | 90 | 122 |
| Comparative Example 2 | 3,800 | – | 100/0 | 4,050 | No defect after 500,000 cycles | 137 | 60 | 93 |

As shown in Table 1, it was obvious that the improvement while cut-growth and flex-crack resistance was attained in keeping high tensile strength both at room temperature and at high-speed testing condition and good casting processability in the case of the polyether urethane elastomer compositions of Examples 1 and 2.

Table 3

| Example No. | Number Average Molecular Weight of Polyether (I) | (II) | Mixing Ratio I/II (wt/wt) | Weight Average Molecular Weight after Mixing | Cut-Growth and Flex-Crack Resistance (cycles) | Tensile Strength (kg/cm²) at room temperature | at 100°C | at high speed |
|---|---|---|---|---|---|---|---|---|
| Comparative Example 6 | 800 | 3,800 | 80/20 | 1,600 | 86,000 | 570 | 240 | 260 |
| Comparative Example 7 | 5,000 | 11,500 | 80/20 | 6,300 | No defect after 500,000 cycles | 50 | 30 | Not determined |

In Comparative Example 6, an unsatisfactory result was obtained in cut-growth and flex-crack resistance. In Comparative Example 7, the level of the tensile strength at room temperature, at high temperature and at high speed testing conditions were very low.

EXAMPLES 5 – 6 AND COMPARATIVE EXAMPLES 8 – 9

Following the procedure of Example 1 except using polypropylene glycol instead of polytetramethylene glycol, the elastomeric specimens are obtained. The test results were shown in Table 4.

the isocyanate group was inferior in cut-growth and flex-crack resistance to the specimens of Examples 7 – 9.

The specimen of Comparative Example 11 prepared at the ($d$) value of 1.2 was markedly inferior in tensile strength to the specimens of Examples 7 – 9.

The cut-growth and flex-crack resistance and the tensile strength were all poor in the specimens of Comparative Examples 12 – 13 prepared with the polyether having an almost equal weight average molecular weight as in Examples 7 – 9, and having a molecular weight distribution of a mono-dispersed type.

Table 4

| Example No. | Number Average Molecular Weight of Polyether (I) | (II) | Mixing Ratio I/II (wt/wt) | Weight Average Molecular Weight after Mixing | Cut-Growth Flex-Crack Resistance (cycles) | Tensile Strength (kg/cm²) at room temperature | at 100°C | at high speed |
|---|---|---|---|---|---|---|---|---|
| Example 5 | 1,000 | 8,000 | 80/20 | 2,400 | No defect after 500,000 cycles | 270 | 110 | 210 |
| Example 6 | 1,000 | 8,000 | 60/40 | 4,250 | " | 240 | 105 | 180 |
| Comparative Example 8 | 2,300 | — | 100/0 | 2,400 | " | 100 | 30 | Not determined |
| Comparative Example 9 | 4,000 | — | 100/0 | 4,300 | Not determined | 20 | Not determined | " |

The results of Example 5 and Example 6 of this invention using "DHDM type polypropylene glycol" were superior in tensile strength than that of Comparative Examples 8 and 9 using polypropylene glycols having molecular weight distributions of mono-dispersed types.

EXAMPLES 7 – 9 and COMPARATIVE EXAMPLES 10 – 13

According to Example 1, the elastomeric specimens were prepared at various ($d$) values by using polytetramethylene glycols, tolylene diisocyanate, and methylene bis(ortho-chloroaniline).

The test results were shown in Table 5.

EXAMPLE 10 and COMPARATIVE EXAMPLE 14

The specimen of Example 10 was prepared by using a DHDM type polyether composed of two polytetramethylene glycols having number average molecular weights of 1,000 and 6,000, respectively, in the weight ratio of 65/35 (wherein the weight average molecular weight of the DHDM type polyether mixture was 2,850 and this mixture was converted to an isocyanate-terminated prepolymer by means of the reaction with tolylene diisocyanate at 80°C for 8 hours, and followed by curing with trimethylol propane at 100°C for 20 hours.). The equivalent ratio ($d$) of the active hydrogen of the curing agent to the isocyanate group was 1.0. As Table 5

| Example No. | Number Average Molecular Weight of Polyether (I) | (II) | Mixing Ratio I/II (wt/wt) | Weight Average Molecular Weight after Mixing | Active Hydrogen/ —NCO equiv. ratio | Cut-Growth and Flex-Crack Resistance (cycles) | Tensile Strength (kg/cm²) at room temperature | at 100°C | at high speed |
|---|---|---|---|---|---|---|---|---|---|
| Comparative Example 10 | 800 | 5,000 | 80/20 | 1,640 | 0.9 | 8,900 | 510 | 230 | 250 |
| Example 7 | 800 | 5,000 | 80/20 | 1,640 | 0.95 | 200,000 | 500 | 210 | 230 |
| Example 8 | 800 | 5,000 | 80/20 | 1,640 | 1.0 | No defect after 500,000 cycles | 500 | 210 | 220 |
| Example 9 | 800 | 5,000 | 80/20 | 1,640 | 1.1 | " | 280 | 140 | Not determined |
| Comparative Example 11 | 800 | 5,000 | 80/20 | 1,640 | 1.2 | " | 100 | 30 | " |
| Comparative Example 12 | 1,500 | — | 100/0 | 1,560 | 1.0 | 50,000 | 320 | 120 | 120 |
| Comparative Example 13 | 1,500 | — | 100/0 | 1,560 | 1.1 | No defect after 500,000 cycles | 150 | 55 | Not determined |

The specimen of Comparative Example 9 prepared at 0.9 of the equivalent ratio ($d$) of the active hydrogen to a test result of the cut-growth and flex-crack resistance, any cut-growth to break could not be observed even after the fatigue test of 500,000 cycles.

On the other hand, the specimen of Comparative Example 14 was prepared by using a polytetramethylene glycol having the weight average molecular weight of 2,900 and having a molecular weight distribution of a mono-dispersed type. The similar De Mattia test for this comparative specimen resulted in the break of the specimen after only about 90,000 cycles.

EXAMPLE 11 AND COMPARATIVE EXAMPLE 15

An elastomeric specimen of Example 11 was prepared in the similar manner as described in Example 10 except using 4,4'-diphenylmethane diisocyanate instead of tolylene diisocyanate and using 1,4-butanediol as a curing agent instead of trimethylol propane.

In the De Mattia test for this specimen, any cut-growth to break could not be observed even after the fatigue test of 500,000 cycles.

On the other hand, the specimen of Comparative Example 14 was prepared by using the polyether having a molecular weight distribution of a mono-dispersed type and having a weight average molecular weight almost the same as described above (i.e. 2,900). The similar De Mattia test for this specimen resulted in the break of specimen after the elongation straining of only about 76,000 cycles.

EXAMPLE 12

An elastomeric specimen of Example 12 was prepared in a similar manner as described in Example 1 except using the polyether of another DHDM type which is composed of polytetramethylene glycol having the number average molecular weight of 1,000 and polypropylene glycol having the number average molecular weight of 8,000 in the weight ratio of 80/20. The equivalent ratio of the active hydrogen of the curing agent, methylene bis(ortho-chloroaniline), to the isocyanate group was 1.0.

The test of the cut-growth and flex-crack resistance resulted in no break after elongation straining of 500,000 cycles.

The tensile strength of the specimen at room temperature, at high temperature (100°C) and at high speed (1m/sec) were as excellent as 470 kg/cm², 200 kg/cm² and 280 kg/cm²; respectively.

We claim:

1. Polyether urethane elastomer composition having improved mechanical properties prepared by using polyfunctional isocyanate, curing agent and polyether having active hydrogen terminal groups which can react with the isocyanate group, wherein weight average molecular weight of said polyether is within the range of 1,000 to less than 4,500 and the molecular weight distribution curve of said polyether has at least two peaks, at least one of which is located in the higher molecular weight region and at least another one of which is located in the lower molecular weight region than the critical molecular weight of said polyether and wherein the equivalent ratio (d) of active hydrogen of a curing agent to the isocyanate group of said polyfunctional isocyanate is in the range of $0.9 < d < 1.2$.

2. Polyether urethane elastomer composition as claimed in claim 1, wherein the polyether component is prepared by mixing at least one polyether having the peak of its molecular weight distribution curve below the critical molecular weight of said polyether component and at least one other polyether having the peak of its molecular weight distribution curve above the critical molecular weight of said polyether component.

3. Polyether urethane elastomer composition as claimed in claim 1, wherein said active hydrogen terminal group is at least one selected from the group consisting of terminal hydroxyl group, terminal amino group, terminal carboxyl group and terminal thiol group.

4. Polyether urethane elastomer composition as claimed in claim 1, wherein said polyether is at least one selected from the group consisting of polyalkylene dicarboxylic acid, polyalkylene dithiol, polyalkylene diamine, their mixtures, and pre-extended polymers produced by subjecting such polyethers to reaction with a diisocyanate or diisocyanate prepolymer of such polyethers.

5. Polyether urethane elastomer composition as claimed in claim 1, wherein said polyether is polyalkylene glycol.

6. Polyether urethane elastomer composition as claimed in claim 4, wherein said pre-extended polymer is prepared by reacting polyalkylene glycol with diisocyanate.

7. Polyether urethane elastomer composition as claimed in claim 5, wherein said polyalkylene glycol is selected from the group consisting of polyethylene glycol, polypropylene glycol, polytetramethylene glycol and their mixtures.

8. Polyether urethane elastomer composition as claimed in claim 5, wherein said polyalkylene glycol is polytetramethylene glycol.

9. Polyether urethane elastomer composition as claimed in claim 1, wherein said polyfunctional isocyanate is at least one selected from the group consisting of aromatic diisocyanate, aliphatic diisocyanate and triisocyanate.

10. Polyether urethane elastomer composition as claimed in claim 1, wherein said polyfunctional isocyanate is at least one selected from the group consisting of tolylene-2,4-diisocyanate, tolylene-2,6-diisocyanate, naphthalene-1,5-diisocyanate, diphenyl-4,4'-diisocyanate, diphenylmethane-4,4'-diisocyanate, 1,6-hexamethylene diisocyanate, 1,3-, and 1,4-cyclohexyl diisocyanate, methylene-bis(4-cyclohexyl diisocyanate), 1,3- and 1,4-xylylene diisocyanate, and their mixtures.

11. Polyether urethane elastomer composition as claimed in claim 1, wherein said curing agent is at least one selected from the group consisting of polyamine and polyol.

12. Polyether urethane elastomer composition as claimed in claim 1, wherein said curing agent is at least one selected from the group consisting of methylene bis(ortho-chloroaniline), naphthalene-1,5-diamine, ortho-, meta- and para-phenylenediamine, tolylene-2,4-diamine, dichlorobenzidine, diphenylether-4,4'-diamine, hydrazine, ethylenediamine, hexamethylene-1,6-diamine, piperazine, ethylene glycol, 1,3-propylene glycol, 1,3- and 1,4-butanediol, trimethylolpropane and their mixtures.

13. Process for preparation of the polyether urethane elastomer composition as claimed in claim 2, wherein after mixing the polyethers the mixture so obtained is subjected to reaction with polyfunctional isocyanate selected from the group consisting of aromatic diisocyanate and aliphatic diisocyanate and triisocyanate and then the mixture of polyethers and polyfunctional isocyanate is cured with at least one curing agent selected from the group consisting of polyamine and polyol.

14. Process for preparation of the polyether urethane elastomer composition as claimed in claim 2, wherein, after mixing the polyethers the polyether mixture is subjected to reaction with polyfunctional isocyanate selected from the group consisting of aromatic diisocyanate and aliphatic diisocyanate and triisocyanate and curing agent selected from the group consisting of polyamine and polyol at the same time.

* * * * *